United States Patent Office.

THOMAS MARTIN AND J. G. EVANS, OF MUSCATINE, IOWA.

Letters Patent No. 71,629, dated December 3, 1867.

IMPROVED BURNING-FLUID.

*The Schedule referred to in these Letters Patent and making part of the same.*

TO WHOM IT MAY CONCERN:

Be it known that we, THOMAS MARTIN and J. G. EVANS, of Muscatine, in the county of Muscatine, and State of Iowa, have invented a new and useful Improvement in Burning-Fluids; and we do hereby declare that the following is a full, clear, and exact description thereof, namely:

The object of our invention is to provide a better and cheaper article of burning-fluid, for illuminating purposes, than any similar commodity heretofore known.

To this end we take of the best benzine forty gallons, and of aqua ammoniae one pound, and mix them thoroughly together by rolling or shaking the barrel or other vessel in which they are placed. We then add the following ingredients, to wit: Two pounds pure chloride of lime; two pounds Irish moss; two pounds protosulphate of iron; four ounces of gum-camphor; and four ounces of the essence of peppermint. As soon as these substances are thoroughly united the fluid is ready for use.

We find that a fluid prepared according to the foregoing formula, burns with a very clear, white flame, gives off but little smoke, and makes less char on the lamp-wick than any preparation from benzine, benzole, or kerosene heretofore used. We also find our fluid almost entirely free from gummy substances, such as are often found on coal-oil burners, and it has scarcely any offensive odor. These qualities render our burning-fluid exceedingly valuable for family use, and very desirable in any place where cheap and pleasant artificial light is required.

What we claim as our invention, and desire to secure by Letters Patent, is—

A burning-fluid composed of the ingredients and combined in the proportions herein specified.

THOMAS MARTIN,
J. G. EVANS.

Witnesses:
L. H. WASHBURN,
THOMAS HOMER.